(12) United States Patent
Bagley et al.

(10) Patent No.: US 9,443,210 B2
(45) Date of Patent: Sep. 13, 2016

(54) INTERACTIVE PRODUCT CONFIGURATOR WITH AUTOMATIC SELECTIONS

(75) Inventors: Claire M. Bagley, Carlisle, MA (US); David J. Kulik, Carlisle, MA (US); Joyce Ng, Sunnyvale, CA (US); Martin P. Plotkin, Concord, MA (US); Gao Chen, Malden, MA (US); Michael Colena, Lowell, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1313 days.

(21) Appl. No.: 12/276,644

(22) Filed: Nov. 24, 2008

(65) Prior Publication Data

US 2010/0131872 A1 May 27, 2010

(51) Int. Cl.
*G06F 17/00* (2006.01)
*G06Q 10/06* (2012.01)
*G06F 17/24* (2006.01)
*G06Q 30/06* (2012.01)

(52) U.S. Cl.
CPC ............. *G06Q 10/06* (2013.01); *G06F 17/243* (2013.01); *G06Q 30/0621* (2013.01)

(58) Field of Classification Search
CPC .................. G06F 17/243; G06Q 30/0621
USPC .......................................... 709/220; 715/764
See application file for complete search history.

(56) References Cited

U.S. PATENT DOCUMENTS

| | | | |
|---|---|---|---|
| 5,682,538 A * | 10/1997 | Lemire et al. | 715/210 |
| 6,208,339 B1 * | 3/2001 | Atlas et al. | 715/780 |
| 6,647,156 B1 * | 11/2003 | Meding | 382/305 |
| 6,651,217 B1 * | 11/2003 | Kennedy et al. | 715/224 |
| 7,069,537 B2 | 6/2006 | Lazarov | |
| 7,333,968 B2 | 2/2008 | Geller et al. | |
| 2002/0107749 A1 | 8/2002 | Leslie et al. | |
| 2002/0143653 A1 * | 10/2002 | DiLena et al. | 705/26 |
| 2002/0166089 A1 | 11/2002 | Noy | |
| 2002/0198935 A1 * | 12/2002 | Crandall et al. | 709/203 |
| 2003/0078949 A1 * | 4/2003 | Scholz et al. | 707/505 |
| 2003/0135401 A1 * | 7/2003 | Parr | 705/8 |
| 2004/0019852 A1 | 1/2004 | Purvis | |
| 2005/0198621 A1 | 9/2005 | Tillmann et al. | |
| 2005/0257148 A1 * | 11/2005 | Goodman et al. | 715/534 |

(Continued)

FOREIGN PATENT DOCUMENTS

JP 2001331261 A * 11/2001

OTHER PUBLICATIONS

Frühwirth, Thom et al., "Principles of Constraint Systems and Constraint Solvers", Archives of Control Sciences: Special Issue on Constraint Programming 16(2) http://www.informatik.uni-ulm.de/pm/mitarbeitar/fruehwirth/Papers/acs-systems3.pdf, 2006.

(Continued)

*Primary Examiner* — William Bashore
*Assistant Examiner* — Gregory A Distefano
(74) *Attorney, Agent, or Firm* — Miles & Stockbridge P.C.

(57) ABSTRACT

A product configurator comprises a constraint network having a plurality of nodes. The configurator allows a modeler to designate that one of more nodes of a configuration are input-required nodes. During an interactive session, the configurator may receive a request for an auto-completion of the configuration. The configurator will determine if an input has been received for the input-required nodes, and prohibit the auto-completion if the input has not been received.

18 Claims, 9 Drawing Sheets

(56) References Cited

U.S. PATENT DOCUMENTS

| | | | |
|---|---|---|---|
| 2005/0278271 A1 | 12/2005 | Anthony et al. | |
| 2006/0179404 A1* | 8/2006 | Yolleck et al. | 715/507 |
| 2007/0094184 A1 | 4/2007 | Emek et al. | |
| 2007/0130506 A1* | 6/2007 | Danninger | 715/507 |
| 2008/0120257 A1* | 5/2008 | Goyal et al. | 706/12 |
| 2010/0036747 A1* | 2/2010 | Bagley et al. | 705/26 |

OTHER PUBLICATIONS

Lhomme, Oliver, "Consistency Techniques for Numeric CSPs", Proceedings in IJCAI-93 pp. 232-238, 1993 Chambery, France.

Selectica, "Selectica Configuration", Solution Overview, 2005, Selectica, Inc., San Jose, CA.

Ilog, "ILOG Configurator, Powering online product and service configuration application", Product Datasheet, Mar. 2005, ILOG.S.A.

Oracle, "Oracle Configurator", Oracle Data Sheet, 2008, Oracle.

Tacton, "Tacton's Sales Configurator—Bridging the gap between engineering and sales for selling customized products.", http://www.tacton.com/templates/page_68.aspx?epslanguage=EN, 2007, Tacton Systems AB, Sweden.

Benhamou, Frédérick et al., "Applying Interval Arithmetic to Real, Integer and Boolean Contraints", Journal of Logic Programming, 32(1), 1997.

Sabin, Daniel et al. "Configuration as Composite Constraint Satisfaction", Proceedings of the ($1^{st}$) Artificial Intelligence and Manufacturing Research Planning Workshop, 1996.

Fleischanderl, Gerhard et al., "Configuring Large Systems Using Generative Constraint Satisfaction", IEEE, pp. 59-68, No. 1094-7167/98, Jul./Aug. 2008, IEEE.

Mittal, Sanjay et al., "Dynamic Constraint Satisfaction Problems", Proceedings of the Eighth National Conference on Artificial Intelligence, 1996.

Stumptner, Markus et al., "Generative Constraint-Based Configuration of Large Technical Systems", Artificial Intelligence for Engineering Design, analysis and Manufacturing, pp. 307-320, No. 12, 1998, Cambridge University Press, USA.

Gelle, Esther et al., "Solving Methods for Conditional Constraint Satisfaction", IJCAL, 2003.

\* cited by examiner

INTERACTIVE PRODUCT CONFIGURATOR WITH AUTOMATIC SELECTIONS

FIELD OF THE INVENTION

One embodiment is directed generally to computer interaction, and in particular to an interactive product configuration.

BACKGROUND INFORMATION

Many current products and services can be customized by a user/customer before being purchased. For example, computer systems typically include many possible options and configurations that can be specifically selected or configured by the customer. Other examples of highly configurable products and services include telephone switching systems, airplanes, automobiles, mobile telephone services, insurance policies, and computer software.

Product and service providers typically provide a "product configurator" that allows a customer or sales engineer to interact with a computer in order to customize and configure a solution by selecting among optional choices. Some known product configurators are constraint based. For these configurators, constraints are enforced between optional choices, allowing the user to select the choices they want, while validating that the resulting set of user choices is valid.

In addition to configuring a product through user choices/selections, in some instances the product configurator itself automatically makes configuration selections. For example, as the result of certain user selections, an additional selection can be inferred based on the user selection and the subsequent enforcement of product constraints. Further, default decisions and decisions in response to an "auto-completion" mode are automatically made by some known configurators. Default and auto-completion decisions are typically arbitrary or heuristically guided decisions that can be used to complete a configuration solution without requiring a user to make all of the choices.

SUMMARY OF THE INVENTION

One embodiment is a product configurator that comprises a constraint network having a plurality of nodes. The configurator allows a modeler to designate that one of more nodes of a configuration are input-required nodes. During an interactive session, the configurator may receive a request for an auto-completion of the configuration. The configurator will determine if an input has been received for the input-required nodes, and prohibit the auto-completion if the input has not been received.

DETAILED DESCRIPTION

One embodiment is an interactive product configurator that distinguishes between user-supplied selections, inferred selections, and automatic selections such as default selections and auto-completion selections. The configurator requires some selections to be made by the user, and includes user interfaces that provide the user with information on the source of configurator selections.

Figure 1:
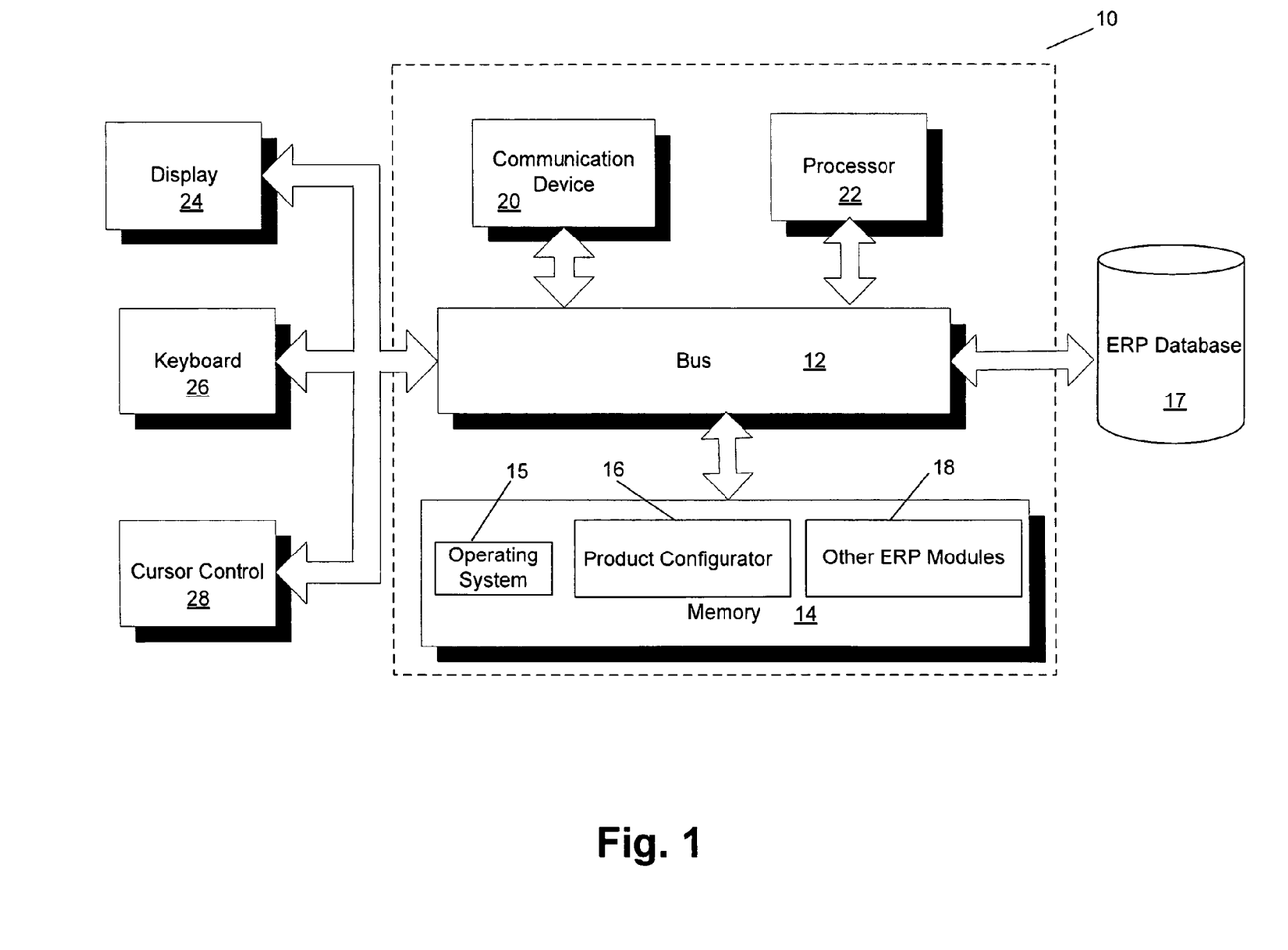
FIG. 1 is a block diagram of a system that can implement an embodiment of the present invention.

FIG. 1 is a block diagram of a system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a product configurator 16 that performs interactive product configuration as disclosed in more detail below. The modules further include other enterprise resource planning ("ERP") modules 18 of an ERP system that may interact with product configurator 16, such as a bill of material ("BOM") module and a customer relationship manager ("CRM") module. An ERP system is a computer system that integrates several data sources and processes of an organization into a unified system. A typical ERP system uses multiple components of computer software and hardware to achieve the integration. A unified ERP database 17, coupled to bus 12, is used to store data for the various system modules. In one embodiment, ERP modules 18 are part of the "Oracle E-Business Suite Release 12" ERP system from Oracle Corp. In other embodiments, product configurator 16 may be a stand-alone system and not integrated with an ERP system, or may be part of any other integrated system.

In one embodiment, product configurator 16 allows a user to interactively configure a product or service by choosing options. Product configurator 16 in one embodiment is constraint based in that it solves a constraint problem to arrive at a solution (i.e., an appropriate and valid configuration). A constraint problem is a problem with a given set of variables, a given set of values or range of values (referred to as a "domain") for each variable, and a given set of constraints. Each constraint restricts the values, from the set of values, that may be simultaneously assigned to each variable of the set of variables. The solution is a combination of assignments of values to each variable that is consistent with all constraints.

A configuration "model" is created in order to implement a configurator. A model represents a generic framework of a solution, or of many possible solutions, to a problem, and includes a classification of associated model entities. The model entities are referred to as "nodes" and represent the domains of the constraint based system. A model may represent an apparatus, such as an automobile, with various option packages; a system such as a telecommunications network, with various hardware, software, protocol and service options; a suite of available services; a suite of software applications, etc. A constraint network is a series of nodes linked by constraints.

When a model is created and executed by product configurator 16, a user can interact with the model. The interaction in general involves the user being presented with a series of choices or items. Each item is represented by a variable in the underlying constraint system. Each variable has a domain, which is a range or set of possible values (e.g., integers between 0 and 10, the set of blue, red or green, etc.). As choices are made by the user, the domain may shrink. For example, if the configurator is for a car, the user may choose a sedan instead of a convertible. However, in the next choice, which is the color of the car, red may no longer be available because a sedan cannot be configured in red.

A complete configuration solution is one in which a valid selection has been made for each possible choice within the product structure and that reduces each domain in the constraint network to a single value. For complex product offerings, the end user may need to make many choices to reach a valid and complete state. Additionally, the end user may not have the necessary domain expertise to properly specify all choices, or may have no preferences with regard to many of the choices. Some known constraint based configurators provide a method for automated selection (referred to as "auto-completion"), which uses heuristic search to make automated choices on behalf of the end user to reach a valid and complete configuration state and to go from a partial solution to a complete solution.

While automated configuration completion is a powerful tool to assist the user, businesses offering configurable products may wish to prohibit automated selection for some aspects of the configuration, preferring instead to enforce a mandatory end user choice for some of the configuration. For example, some of the user's selections are needed to constrain the possible solutions sufficiently to permit an efficient heuristic search for a complete solution. Further, some of the selections are of such significance that the modeler of the configurator may want to ensure that the user is directly responsible for them and actively makes the selection to prevent the user from being "surprised" by important decisions. Requiring the user to make some selections may also assist in guiding a user to a specific desired configuration.

In one embodiment, product configurator 16 allows the configuration modeler to annotate which configuration components/nodes or attributes must be specified by the end user or other means rather than determined by automated selections such as via auto-completion. In one embodiment, "input-required" nodes indicate nodes that need an input prior to the invocation of auto-completion. The input may be provided by the user, or may be provided via inferred or default input. When a user then interacts with product configurator 16, the user is prevented from finishing the configuration without specifying values or a selection for those mandatory configuration components and attributes or having the value otherwise provided (i.e., inferred or default input).

Figure 2:
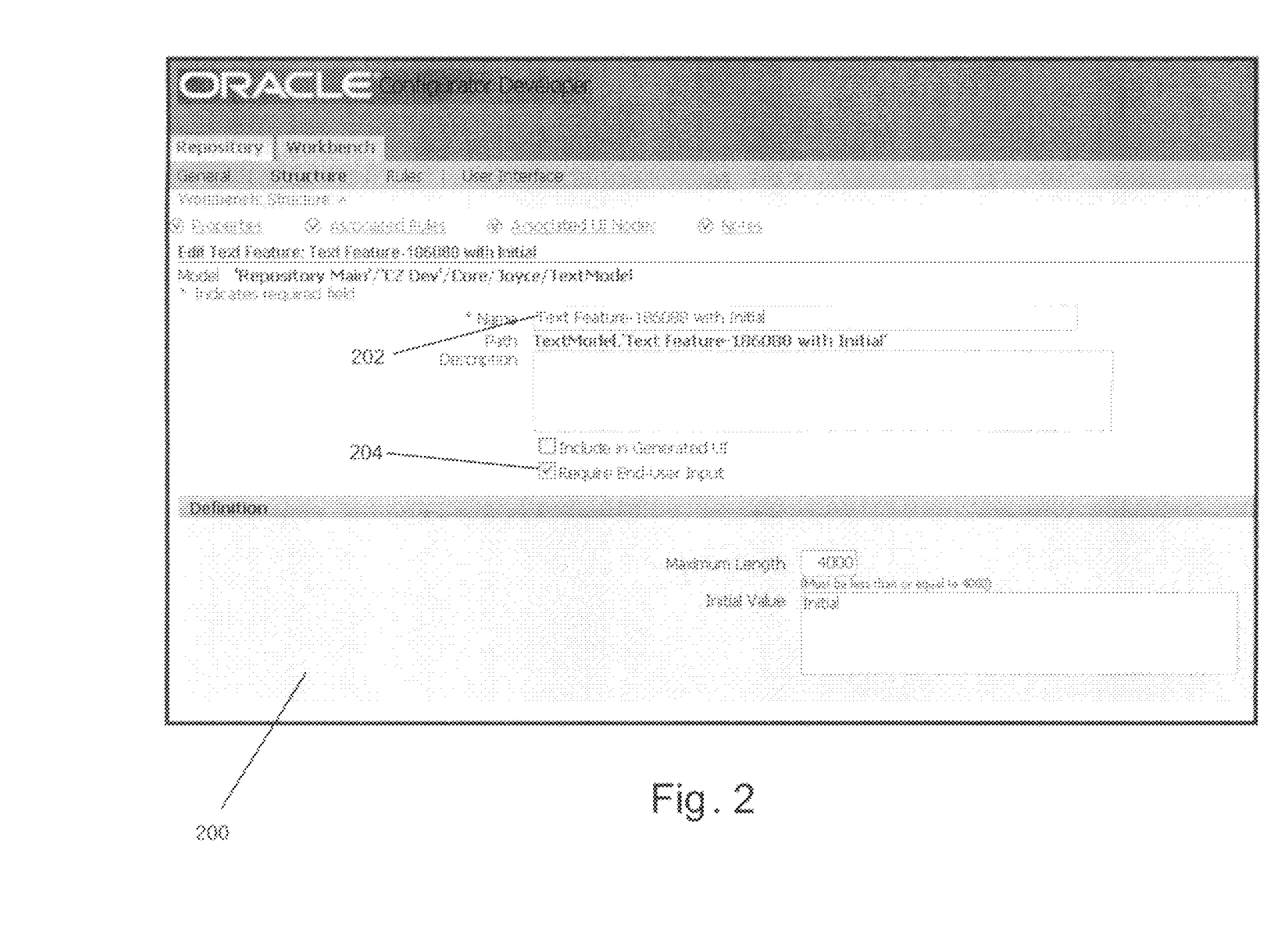
FIG. 2 is a user interface in accordance with one embodiment that allows a modeler to indicate that a value must be provided for a component.

FIG. 2 is a user interface ("UI") 200 in accordance with one embodiment that allows a modeler to indicate that a node is an input-required node, which requires a value or selection to be provided prior to auto-completion. The name of the input-required node that requires input values is entered in field 202 (i.e., "Text Feature-186088 with Initial" in the example of FIG. 2). The modeler can check box 204 to indicate input-required for the node.

Figure 3:
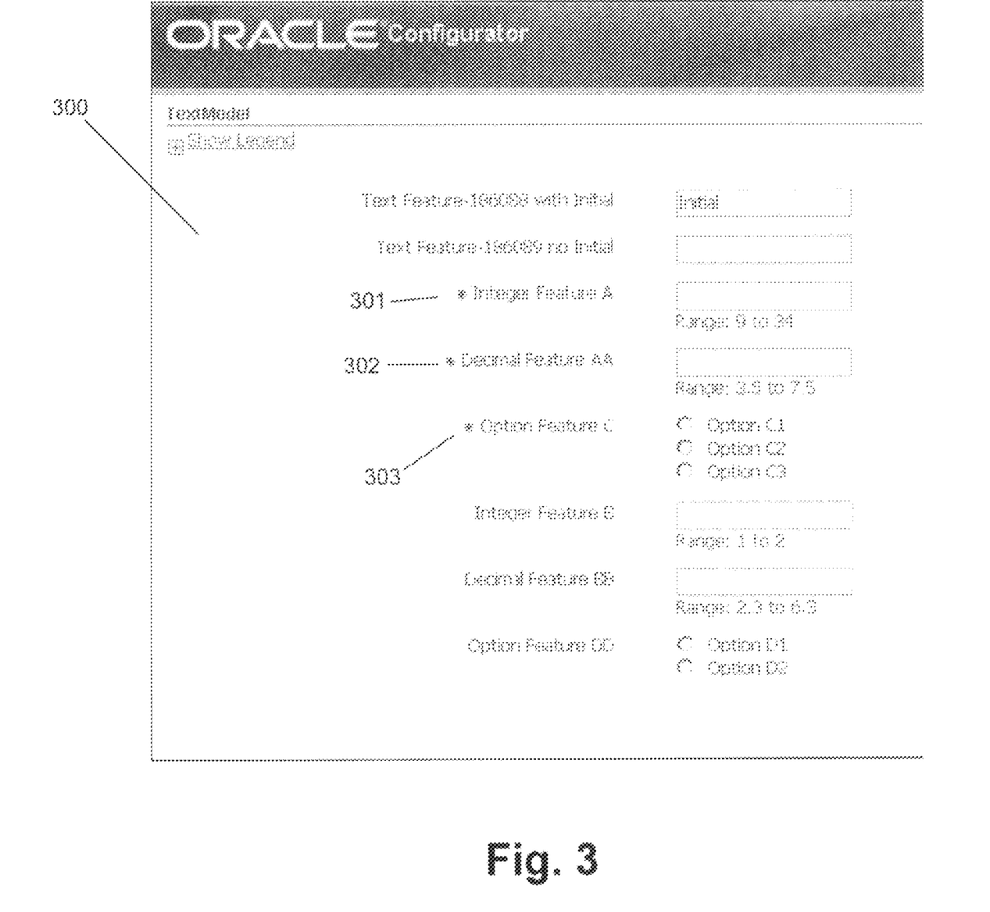
FIG. 3 is a user interface in accordance with one embodiment that a user would encounter when interacting with the product configurator and that indicates which items are input-required.

When a user is interacting with product configurator 16, the items that are input-required, rather than allow input provided via auto-completion, are indicated on a UI. FIG. 3 is a UI 300 in accordance with one embodiment that a user would encounter when interacting with product configurator 16 and that indicates which items are input-required. In the example of FIG. 3, an asterisk that appears next to items 301-303 indicates that the user must provide input for those items (or the item may receive an inferred value or default value). The items without an asterisk can receive input automatically without direct user input via auto-completion. In other embodiments, other types of indicators can be used besides asterisks.

Figure 4:
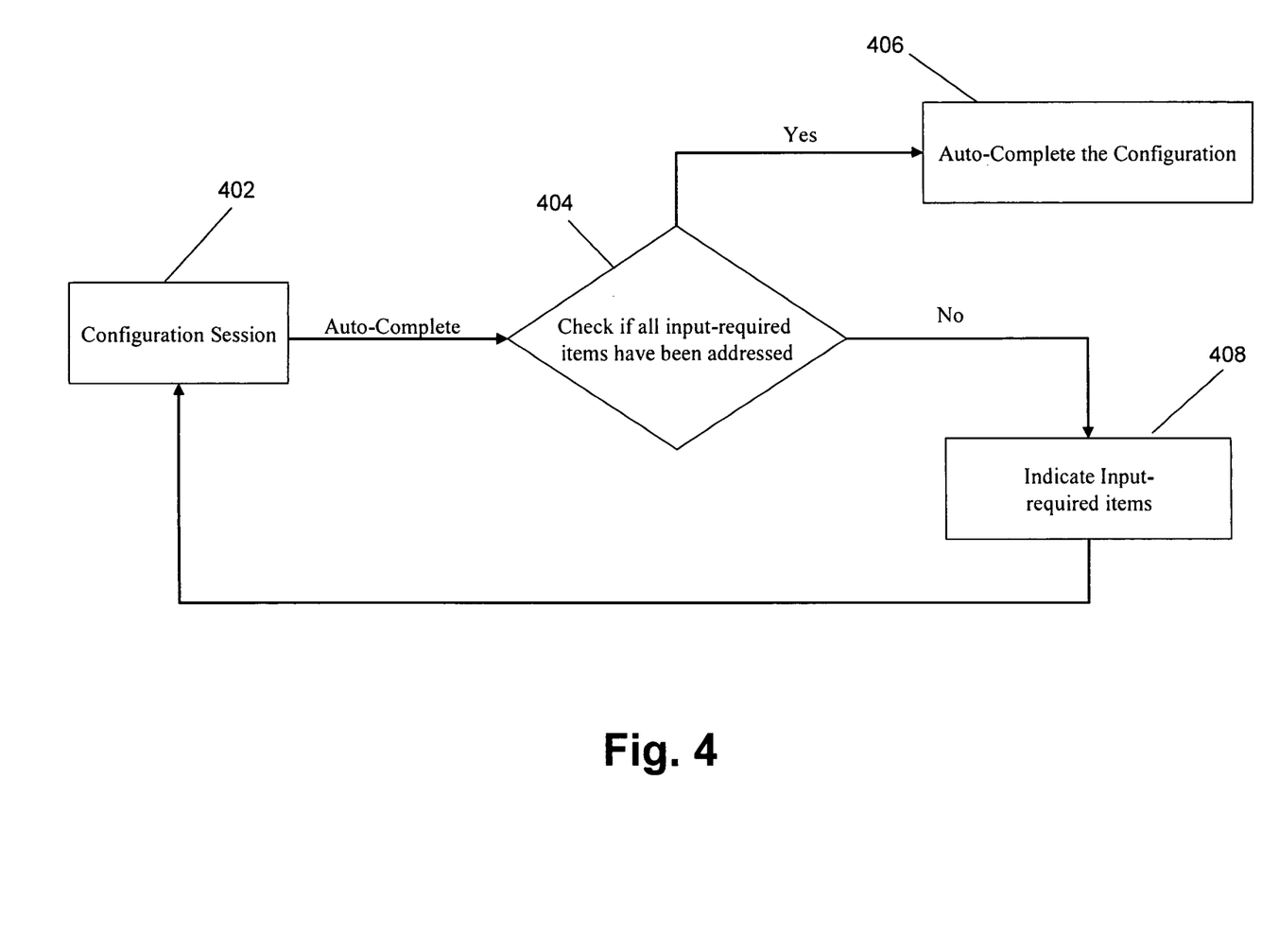
FIG. 4 is a flow diagram of the functionality of the product configurator to prevent auto-completion until all input-required items have been provided in accordance to one embodiment.

In one embodiment, auto-completion is prevented when input-required items have not been addressed. FIG. 4 is a flow diagram of the functionality of product configurator 16 to prevent auto-completion until all input-required items have been provided in accordance to one embodiment. In one embodiment, a user choice is any representation of an action by the user in the configurator user interface ("UI"). Examples of a user provided input/choice include clicking a checkbox, entering a number in a box, choosing a number or choice within a drop down box, etc. In one embodiment, the functionality of the flow diagram of FIG. 4, and FIGS. 7 and 9 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, during a regular configuration session, the user requests that auto-completion be executed in order to generate choices for the remaining selections and to arrive at a complete solution.

At 404, product configurator 16 determines if all the input-required items have been addressed. If yes at 404, at 406 product configurator 16 will auto-complete the configuration and may present a summary screen if there exists any important auto-completed assignments. If no at 404, at 408 product configurator 16 will present a list of input-required items that need attention to the end user and prevent auto-completion to execute until all of them are addressed.

Figure 5:
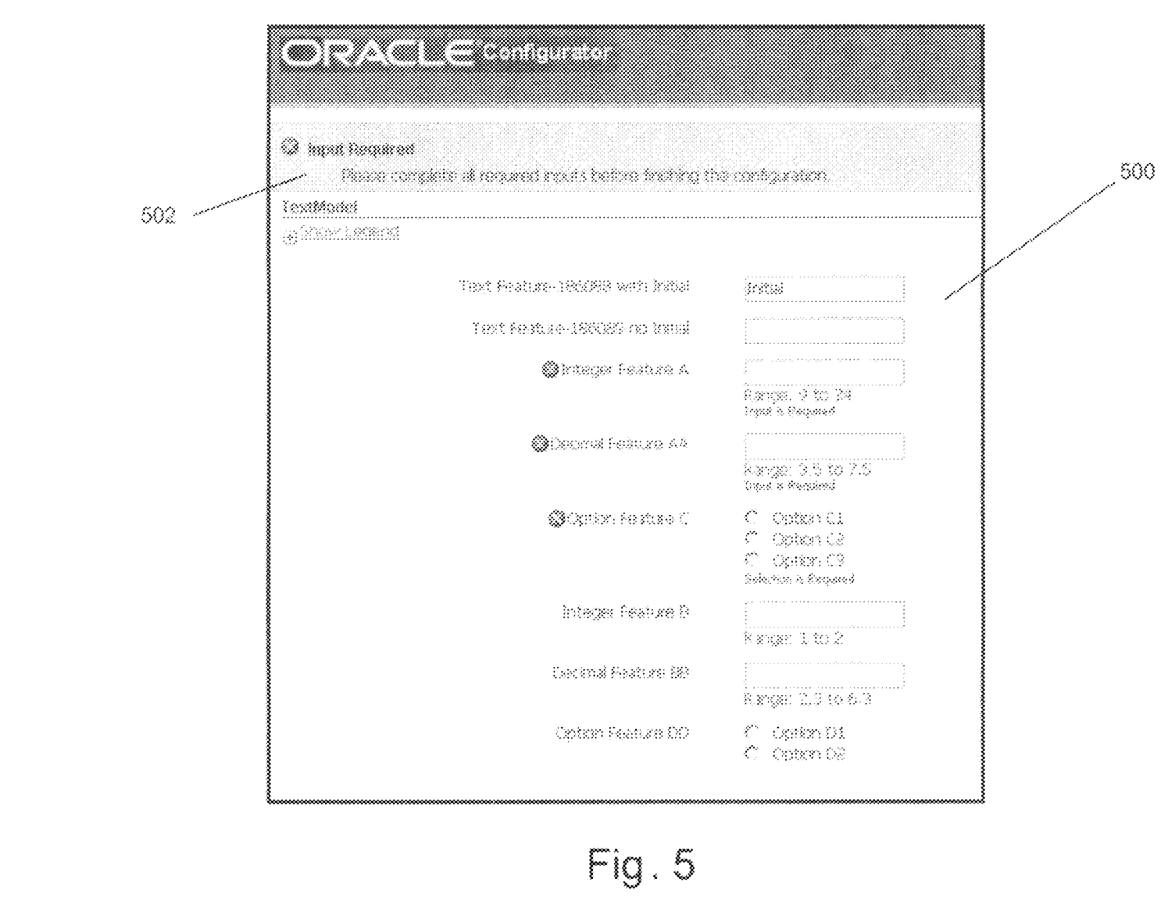
FIG. 5 is a user interface that provides an error message to a user when an attempt of auto-completion is made when there are still input-required items to be addressed.

FIG. 5 is a UI 500 that provides an error message to a user when an attempt of auto-completion is made when there are still input-required items to be addressed. In the example of FIG. 5, error message 502 is accompanied by an indicator next to Integer Feature A, Decimal Feature AA and Option Feature C that indicates that those items are input-required items whose input cannot be provided via auto-completion.

During an interactive configuration session, an item in a configuration can get its value from multiple sources: the value may be a choice/selection made explicitly by the end user ("user selected"); the value may be the result of an automatic enforcement of product constraints (i.e., an inferred selection or "system-inferred"); or the value may be the result of automatic heuristic choices made on behalf of the end user to reach a valid and complete configuration state (i.e., default and auto-completed selections or "system-proposed").

In a complex interactive configuration session, it may become difficult for the end user to remember all explicit choices made. However, it is important to distinguish these types in order to help the end user understand the state of the configuration. These distinctions provide indications to the user about the outcome of their future interaction. For example, it may be helpful during an interaction session for a user to distinguish between a system-inferred value that cannot be changed without causing a conflict, and an explicit choice or a heuristically proposed value which may be changed without causing a conflict.

Figure 6:
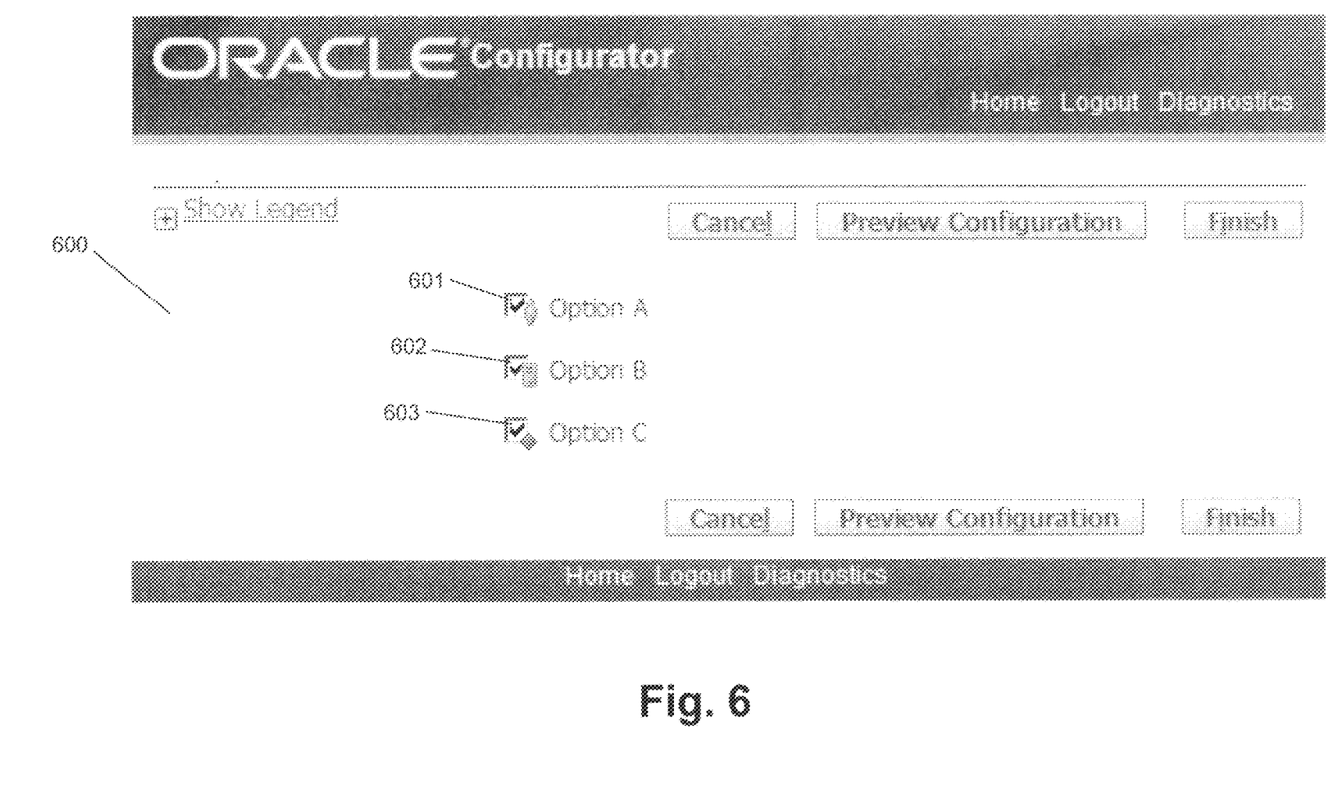
FIG. 6 is a user interface in accordance with one embodiment that allows a modeler to have displayed values marked with different symbols depending on their source.

In one embodiment, product configurator 16 generates a UI that allows a modeler to mark displayed values with different symbols to represent the three value sources: user selected, system-inferred and system-proposed. FIG. 6 is a UI 600 in accordance with one embodiment that allows a modeler to have displayed values marked with different symbols depending on their source. In FIG. 6, different symbols are selected for user selected values ("Option A") at 601, system-inferred values ("Option B") at 602, and system-proposed values ("Option C") at 603.

In one embodiment, system 10 distinguishes system-proposed selections and values from system-inferred selections and values and user selections and values by noting all changes to the state of the configuration that occur after propagating the inferred consequences of the user's input. Any such changes would be the consequence of selections made during the application of defaults or heuristic search for a complete solution.

Figure 7:
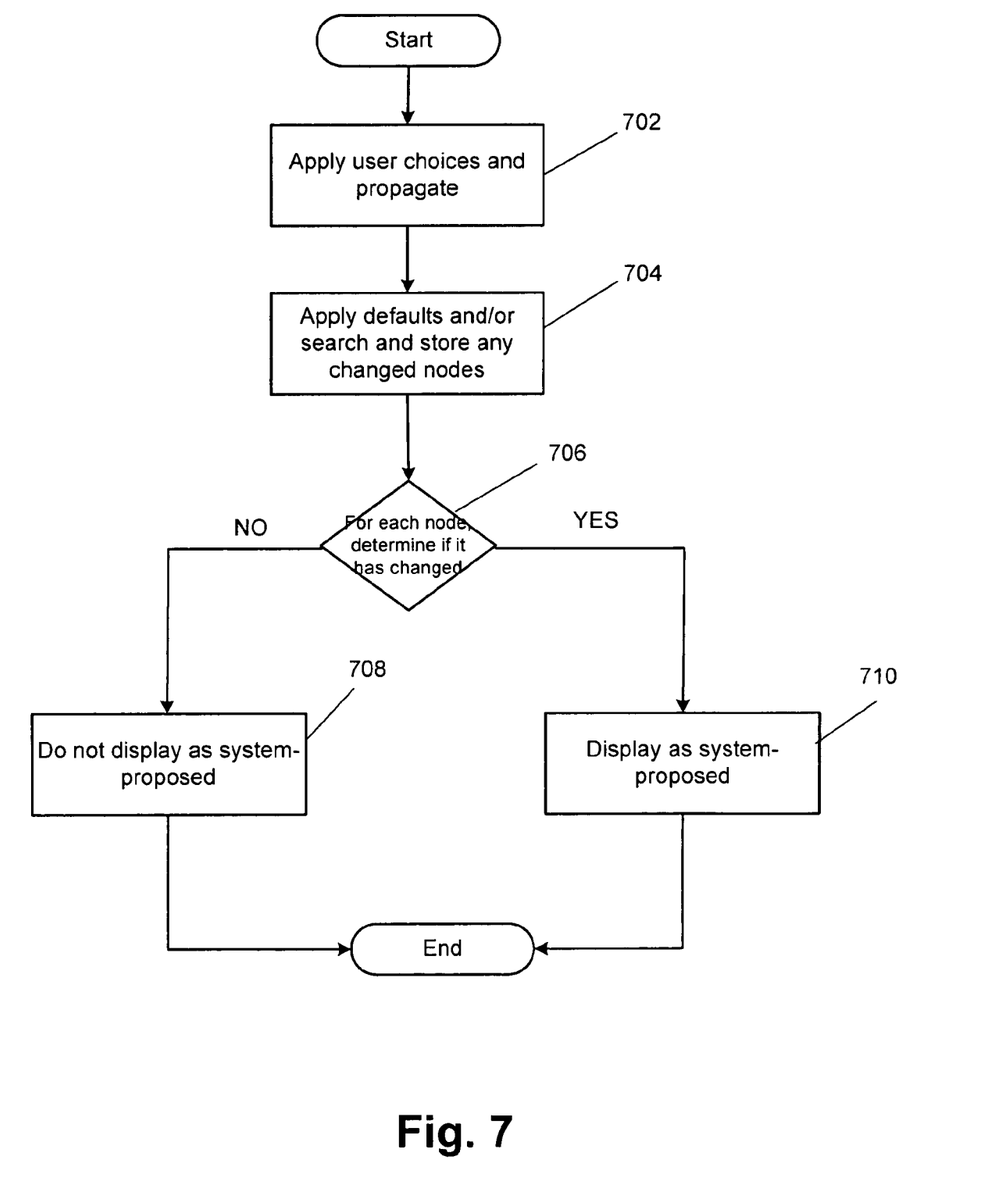
FIG. 7 is flow diagram of the functionality of the product configurator to distinguish the type of selections in accordance to one embodiment.

FIG. 7 is a flow diagram of the functionality of product configurator 16 to distinguish the type of selections in accordance to one embodiment. At 702, the user choice is applied and propagated. At 704, default choices are applied, if any, and any changed nodes as a result of propagation of the default choice is searched for and noted and stored. For each node, at 706 it is determined if that node has changed. In one embodiment, information on whether a node that has changed will have been previously stored at 704. If no at 706, the node is not displayed as a system-proposed node at 708 (i.e., it is a system-inferred node). If yes at 706, the node is displayed as a system-proposed node at 710.

In another embodiment, the distinction between the three different types of selections can also be determined by comparing snapshots of the configuration state before and after application of defaults and heuristic search.

In one embodiment, product configurator 16, after auto-completion, informs the user what parts of the final solution have been changed as a result of auto-completion. Potential changes could include newly proposed decisions that were introduced through the auto-completion process as well as modified default decisions. This allows the user to understand the scope of changes that are a result of the auto-completion.

Figure 8:
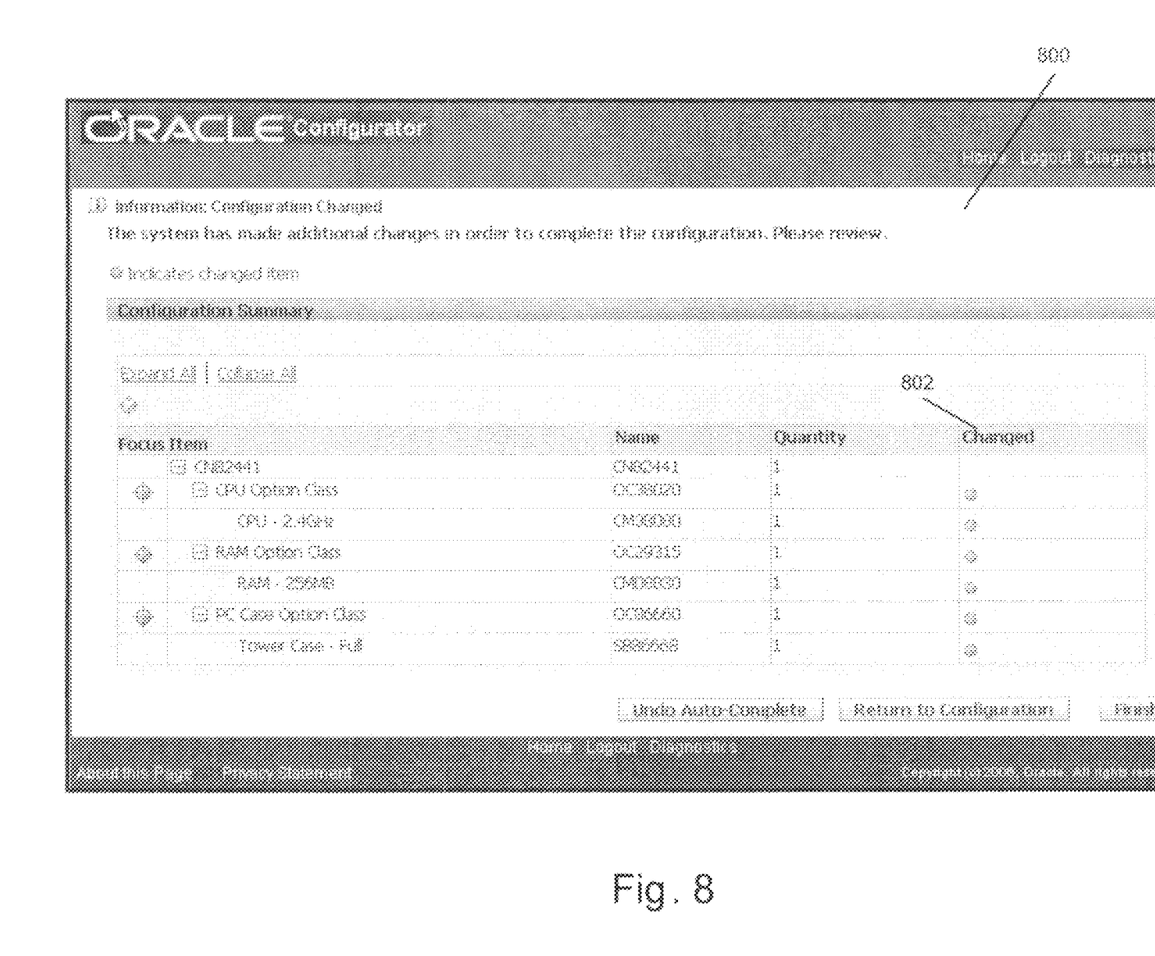
FIG. 8 is a user interface that indicates which values were changed as a result of auto-completion in accordance to one embodiment.

In one embodiment, product configurator 16 generates a UI that indicates changed values to the user as a result of auto-completion. FIG. 8 is a UI 800 that indicates the changed values. In UI 800, a symbol in the changed column 802 is present in the configuration summary if that item was changed as a result of auto-completion.

Figure 9:
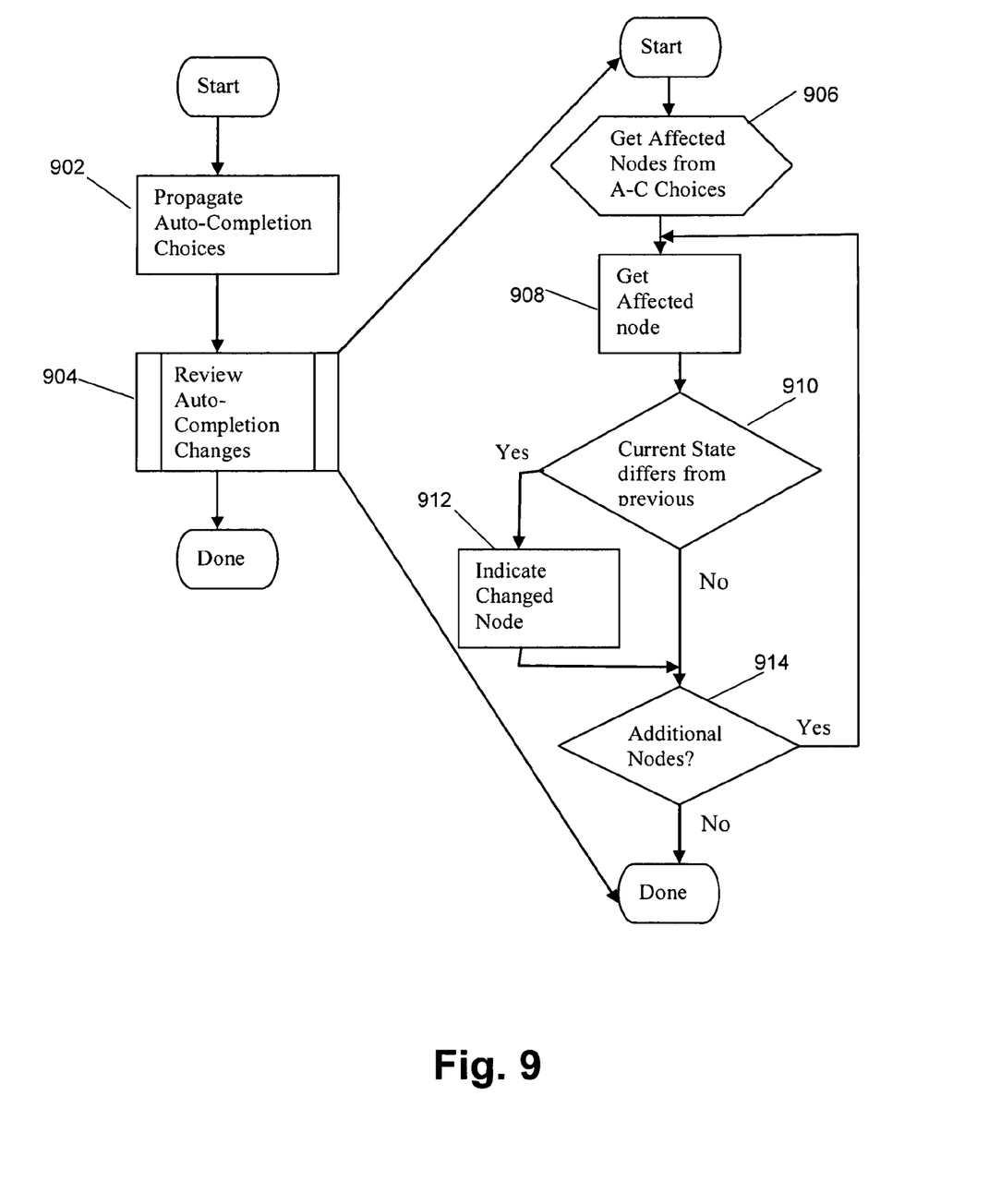
FIG. 9 is a flow diagram of the functionality of the product configurator when noting changes during auto-completion.

In one embodiment, product configurator 16 detects changed selections by noting all changes to the state of the configuration that occur during the auto-completion process. FIG. 9 is a flow diagram of the functionality of product configurator 16 when noting changes during auto-completion. During auto-completion, all auto-completion choices are propagated at 902 and the auto-completion changes are review at 904. 904 includes getting the affected nodes from the propagation of the auto-completion choices at 906. At 908, for each node affected by the auto-completion process, the auto-complete state is compared to its previous state at 910. If the state has changed, the node is indicated to have changed by the auto-completion at 912. At 914, if there are additional nodes the functionality returns to 908 and the next affected node is compared.

As disclosed, embodiments distinguish between the types of selections made in order for a configurator to arrive at a complete solution. The user can be informed of the source of the selections in order to understand how the final configuration was derived.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of operating an interactive product configurator that comprises a constraint network having a plurality of nodes, the method comprising:

designating that one or more nodes of a configuration are input-required nodes, wherein each node comprises an associated domain comprising a set of possible values;

receiving a plurality of choices of a value of a variable from a user for one or more of the nodes, wherein after each of the plurality of choices, the value is propagated over the network before receiving a next choice, and wherein an inferred choice of a value is automatically generated in response to at least one of the propagations;

receiving a request for an auto-completion of the configuration, wherein the auto-completion generates a complete solution for the configuration;

determining if an input has been received for the input-required nodes before the auto-completion, wherein the input comprises providing the value for the variable of the network;

wherein the value for the input-required node may be inferred based on previous user selections of variables and an enforcement of a constraint;

wherein each variable comprises a domain of possible values, and the complete solution for the configuration is generated by reducing each domain to a single value;

wherein when the input was received from the user interacting with a user interface, the user interface comprises an indicator that indicates that the input-required node requires an input from the user prior to an invocation of the auto-completion, and distinguishes the input-required node from other nodes shown on the user interface that are not input-required nodes and can receive a value via the auto-completion;

in response to the request for the auto-completion of the configuration, while generating the complete solution for the configuration, when each of a plurality of default choices is applied, storing which of the nodes of the constraint network have changed in response to the propagation of each applied default choice, wherein a node has changed when its associated set of possible values has changed in response to the propagation; and generating a second user interface that displays the nodes that have changed during the auto-completion.

2. The method of claim 1, further comprising:
prohibiting the auto-completion if the input has not been received for the input-required nodes.

3. The method of claim 1, further comprising:
generating a third user interface that indicates a source of choices for the configuration.

4. The method of claim 3, wherein the source comprises one of a user selected source, a system-inferred source or a system-proposed source.

5. The method of claim 4, wherein the user selected source is a user choice.

6. The method of claim 4, wherein the system-inferred source is an enforcement of a product constraint choice.

7. The method of claim 4, wherein the system-proposed source is one of a default choice or an auto-completion choice.

8. The method of claim 1, wherein the second user interface further displays the nodes that have changed during the auto-completion in response to newly proposed decisions.

9. A non-transitory computer readable medium having instructions stored thereon that, when executed by a processor, causes the processor to function as an interactive product configurator, the instructions comprising:

logic for defining a constraint network having a plurality of nodes wherein each node comprises an associated domain comprising a set of possible values;

logic for designating that one or more nodes of a configuration are input-required nodes;

logic for receiving a plurality of choices of a value of a variable from a user for one or more of the nodes, wherein after each of the plurality of choices, the value is propagated over the network before receiving a next choice, and wherein an inferred choice of a value is automatically generated in response to at least one of the propagations; logic for receiving a request for an auto-completion of the configuration, wherein the auto-completion generates a complete solution for the configuration;

logic for determining if an input has been received for the input-required nodes before the auto-completion, wherein the input comprises providing the value for the variable of the network;

wherein the value for the input-required node may be inferred based on previous user selections of variables and an enforcement of a constraint;

wherein each variable comprises a domain of possible values, and the complete solution for the configuration is generated by reducing each domain to a single value;

wherein when the input was received from a user interacting with the user interface, the user interface comprises an indicator that indicates that the input-required node requires an input from the user prior to an invocation of the auto-completion, and distinguishes the input-required node from other nodes shown on the user interface that are not input-required nodes and can receive a value via the auto-completion;

logic for, in response to the request for the auto-completion of the configuration, while generating the complete solution for the configuration, when each of a plurality of default choices is applied, storing which of the nodes of the constraint network have changed in response to the propagation of each applied default choice, wherein a node has changed when its associated set of possible values has changed in response to the propagation; and logic for generating a second user interface that displays the nodes that have changed during the auto-completion.

10. The computer readable medium of claim 9, the instruction further comprising:
logic for prohibiting the auto-completion if the input has not been received for the input-required nodes.

11. The computer readable medium of claim 9, the instructions further comprising:
logic for generating a third user interface that indicates a source of selection input for the plurality of nodes.

12. The computer readable medium of claim 9, wherein the second user interface further displays the nodes that have changed during the auto-completion in response to newly proposed decisions.

13. The computer readable medium of claim 11, wherein the source comprises one of a user selected source, a system-inferred source or a system-proposed source.

14. The computer readable medium of claim 13, wherein the user selected source is a user choice.

15. The computer readable medium of claim 13, wherein the system-inferred source is an enforcement of a product constraint choice.

16. The computer readable medium of claim 13, wherein the system-proposed source is one of a default choice or an auto-completion choice.

17. An interactive product configurator system comprising:

means for defining a constraint network having a plurality of nodes, wherein each node comprises an associated domain comprising a set of possible values;

means for designating that one or more nodes of a configuration are input-required nodes;

means for receiving a plurality of choices of a value of a variable from a user for one or more of the nodes, wherein after each of the plurality of choices, the value is propagated over the network before receiving a next choice, and wherein an inferred choice of a value is automatically generated in response to at least one of the propagations;

means for receiving a request for an auto-completion of the configuration, wherein the auto-completion generates a complete solution for the configuration;

means for determining if an input has been received for the input-required nodes before the auto-completion, wherein the input comprises providing the value for the variable of the network;

wherein the value for the input-required node may be inferred based on previous user selections of variables and an enforcement of a constraint;

wherein each variable comprises a domain of possible values, and the complete solution for the configuration is generated by reducing each domain to a single value;

wherein when the input was received from a user interacting with the user interface, the user interface comprises an indicator that indicates that the input-required node requires an input from the user prior to an invocation of the auto-completion, and distinguishes the input-required node from other nodes shown on the user interface that are not input-required nodes and can receive a value via the auto-completion;

means for, in response to the request for the auto-completion of the configuration, while generating the complete solution for the configuration, when each of a plurality of default choices is applied, storing which of the nodes of the constraint network have changed in response to the propagation of each applied default choice, wherein a node has changed when its associated set of possible values has changed in response to the propagation; and means for generating a second user interface that displays the nodes that have changed during the auto-completion.

18. The system of claim 17, wherein the second user interface further displays the nodes that have changed during the auto-completion in response to newly proposed decisions.

* * * * *